United States Patent [19]
Golin

[11] Patent Number: 5,305,103
[45] Date of Patent: Apr. 19, 1994

[54] METHOD AND APPARATUS FOR IMPROVED PYRAMIDAL IMAGE ENCODING

[75] Inventor: Stuart J. Golin, East Windsor, N.J.

[73] Assignee: Intel Corporation, Santa Clara, Calif.

[21] Appl. No.: 89,807

[22] Filed: Jul. 9, 1993

Related U.S. Application Data

[63] Continuation-in-part of Ser. No. 813,884, Dec. 23, 1991.

[51] Int. Cl.$^5$ .............................................. H04N 7/13
[52] U.S. Cl. ..................................... 348/415; 348/424
[58] Field of Search ............... 358/136, 138, 133, 105; 382/56; H04N 2/12, 7/13

[56] References Cited

U.S. PATENT DOCUMENTS

| | | |
|---|---|---|
| 4,268,861 | 5/1981 | Schreiber et al. |
| 4,692,806 | 9/1987 | Anderson |
| 4,718,104 | 1/1988 | Anderson |
| 4,785,349 | 11/1988 | Keith et al. |
| 4,853,779 | 8/1989 | Hammer et al. |
| 4,864,396 | 9/1989 | Martens |
| 4,941,042 | 7/1990 | Martens |
| 5,020,120 | 5/1991 | Weldy |
| 5,050,230 | 5/1991 | Jones et al. ..................... 358/166 X |
| 5,067,015 | 11/1991 | Combridge et al. |
| 5,128,756 | 7/1992 | Johnston et al. ............... 358/136 X |

OTHER PUBLICATIONS

Rosenfeld, A. and Kak, A. C. "Digital Picture Processing", Second Edition, Academic Press, Inc., vol. 2, pp. 112-121.

Pei, S. and Chen F., "Subband Decomposition of Monochrome and Color Images by Mathematical Morphology", Optical Engineering, vol. 30, No. 7, Jul. 1991, pp. 921-933.

Primary Examiner—Victor R. Kostak
Attorney, Agent, or Firm—Carl L. Silverman; William H. Murray; Daniel H. Golub

[57] ABSTRACT

A method and apparatus for encoding an original image. The original image is divided into a plurality of regions and a region is selected therefrom for processing. A region energy value is determined in accordance with the magnitudes of the pixels in the selected region. The region energy value is compared to a threshold and a filtered image is formed by selectively zeroing the selected region in accordance with the comparison. The filtered image is resolved into at least one lower resolution image which is encoded. An expanded image is formed in accordance with the encoded lower resolution image, the expanded image being of the same level of resolution as the original image. An image representative of the difference between the original image and the expanded image is encoded at full resolution.

11 Claims, 4 Drawing Sheets

METHOD AND APPARATUS FOR IMPROVED PYRAMIDAL IMAGE ENCODING

CROSS-REFERENCE TO RELATED APPLICATION

The present application is a continuation-in-part of U.S. patent application Ser. No. 07/813,884, filed Dec. 23, 1991.

FIELD OF THE INVENTION

This invention relates to video signal processing generally and particularly to systems for providing a compressed digital video signal representative of a full color video signal.

BACKGROUND

An important aspect of most methods for compressing sequences of digital video images is motion analysis. In typical motion analysis, a target image in a sequence of images is divided into a plurality of blocks of pixels. A target region comprising at least one pixel block is selected from the target image. The image preceding the target image is analyzed in order to locate a region of the preceding image which closely matches the target region of the target image. Block matching techniques based on mean-square-error or mean-absolute-error are typically used to locate the region of the preceding image which closely matches the target region of the target image. If no motion has occurred, the preceding and target regions will have the same coordinates within the image frame. If motion has occurred, the preceding region will be offset or translated relative to the target region by an amount which is represented by a displacement vector. This process is typically repeated for each target region in the target image, thereby yielding a displacement vector for each target region. These displacement vectors are thereafter applied to a previous reconstructed image to form a predicted image. An error image is formed from the difference (residual errors) between the target image and the predicted image. The displacement vectors and the error image are then encoded for subsequent use by a decoder in decoding the compressed digital video signal. A known motion compensation system is described in U.S. Pat. No. 5,134,478 to Golin, entitled "Method And Apparatus For Compressing And Decompressing A Digital Video Signal Using Predicted And Error Images", the contents of which is hereby incorporated herein by reference.

Pyramidal encoding may be employed to encode error images that result from motion analysis. A pyramidal encoding system that would be suitable for encoding such error images is described in the background portion of parent application Ser. No. 07/813,884, filed Dec. 23, 1991, the contents of which are incorporated herein in their entirety by reference. As discussed in the parent application, pyramidal encoding generally provides an effective means for encoding images. The low frequency components of an image are encoded at low resolution and higher frequency components are encoded at higher levels of resolution or at the full resolution level. Since most of the energy of the image is usually at low frequency, most of the image is encoded with relatively few bits. In such cases, full resolution encoding is needed only to sharpen up the image.

It is an object of the present invention to provide an improved system for encoding images, such as error images that result from motion analysis, using pyramidal encoding.

Further objects and advantages of the invention will become apparent from the description of the invention which follows.

SUMMARY OF THE INVENTION

A method and apparatus for encoding an original image. The original image is divided into a plurality of regions and a region is selected therefrom for processing. A region energy value is determined in accordance with the magnitudes of the pixels in the selected region. The region energy value is compared to a threshold and a filtered image is formed by selectively zeroing the selected region in accordance with the comparison. The filtered image is resolved into at least one lower resolution image which is encoded. An expanded image is formed in accordance with the encoded lower resolution image, the expanded image being of the same level of resolution as the original image. An image representative of the difference between the original image and the expanded image is encoded at full resolution.

DETAILED DESCRIPTION OF THE PREFERRED EMBODIMENT

In the preferred embodiment, the present invention is applied to the encoding of difference images in sequence coding, including error images that result after an image is predicted with motion compensation. Such error images represent the errors of prediction, which are typically small values that cluster around zero. The present invention may also be employed to encode images other than difference images.

Figure 1:
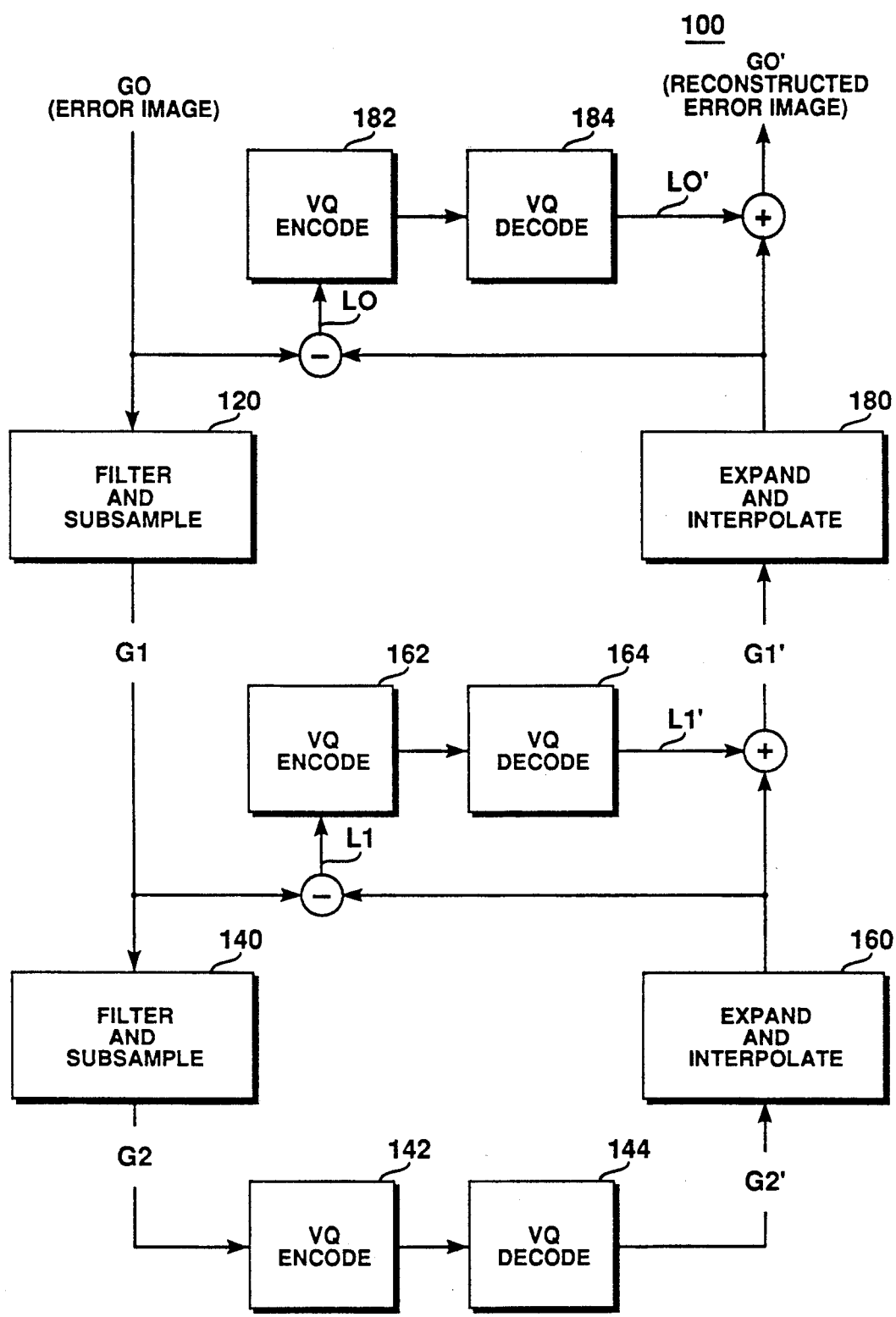
FIG. 1 is a flow diagram showing the operation of a pyramidal encoder according to a preferred embodiment of the present invention.

Referring now to FIG. 1, there is shown a flow diagram illustrating the operation of a pyramidal encoder 100 for encoding an error image G0 (full resolution) according to a preferred embodiment of the present invention. Filter and subsampler 120 is provided for filtering error image G0 with a pyramid-specific filter followed by a low-pass filter, and then subsampling the output of the low-pass filter to generate a first lower resolution image G1. The operation of filter and subsampler 12 is explained in further detail later in this specification in conjunction with FIG. 2. Filter and subsampler 140 is provided for filtering first lower resolution image G1 with a pyramid-specific filter followed by a low-pass filter, and then subsampling the output of the low-pass filter to generate a second lower resolution image G2. Filter and subsampler 140 functions substantially in accordance with filter and subsampler 120.

VQ encoder 142 is provided for encoding lower resolution image G2 using vector quantization (VQ) encoding. The output of encoder 142 is provided to VQ decoder 144 to generate a decoded image G2' which is of the same resolution as second lower resolution image G2. Image expander 160 forms a first expanded image by interpolating decoded image G2' up to the resolution of the first lower resolution image G1. This first expanded image is then subtracted from first lower resolution image G1 and the resultant difference image (L1) is encoded by VQ encoder 162. The output of VQ encoder 162 is provided to VQ decoder 164 which generates a decoded image L1' which is of the same resolution as the first expanded image. Decoded image L1' and the first expanded image are then summed to form image G1'. Image expander 180 forms a second expanded image by interpolating image G1' up to the full resolution level of error image G0. This second expanded image is then subtracted from error image G0 and the resultant difference image (L0) is encoded by VQ encoder 182. The output of VQ encoder 182 is provided to VQ decoder 184 which generates a decoded image L0' which is of the same resolution as error image G0 (full resolution). Finally, a reconstructed error image G0' may be formed by summing decoded image L0' and the second expanded image.

Figure 2:
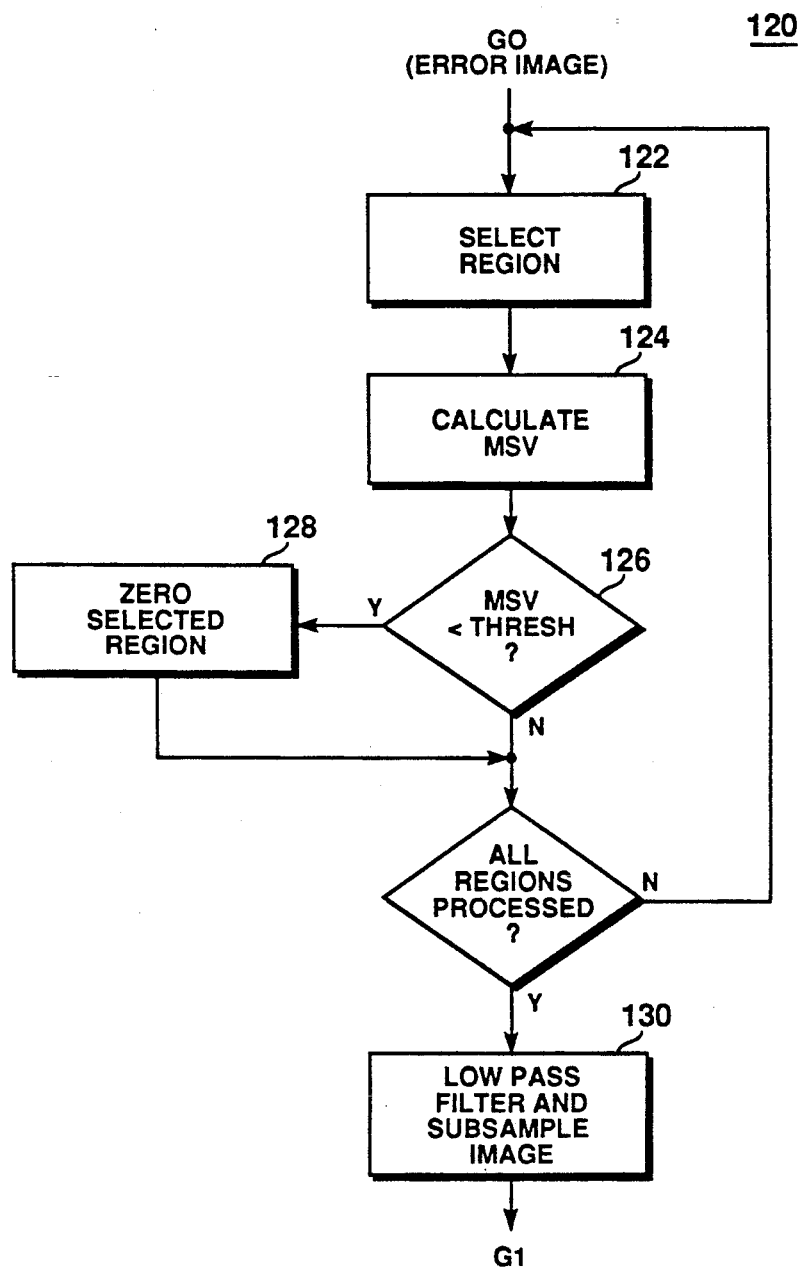
FIG. 2 is a flow diagram showing the operation of an improved pyramid-specific filter according to a preferred embodiment of the present invention.

Referring now to FIG. 2, there is shown a flow diagram illustrating the operation of filter and subsampler 120 according to a preferred embodiment of the present invention. Error image G0 is initially divided into a plurality of individual blocks or regions. Region selector 122 is provided for selecting a region from error image G0 for processing. Region energy determinator 124 is provided for calculating the energy (mean-square-value) of a plurality of the pixels in the selected region. Comparator 126 compares the energy of the selected region to a predetermined threshold. If the energy of the selected region does not exceed the threshold, then pyramid-specific filter 128 zeros all pixels in the selected region. This process is repeated from block selector 122 until all regions of error image G0 have been processed. Thereafter, the resultant error image is applied to low-pass filter and subsampler 130 to generate first lower resolution image G1.

In the preferred embodiment of the present invention, the threshold (thresh) used by comparator 126 is determined in accordance with equation (1) below:

$$thresh = k * q^2 \quad (1)$$

where k is on the order of 1 and q is the expected quantization energy associated with error image G0. In an alternate preferred embodiment, the threshold used by comparator 126 may be determined in accordance with equation (2) below:

$$thresh = noise + (k * q^2) \quad (2)$$

where the "noise" relates to image quality and represents the energy of the expected quantization noise. The "noise" will typically be a constant on the order of two to three gray levels for an image sequence.

Figure 3:
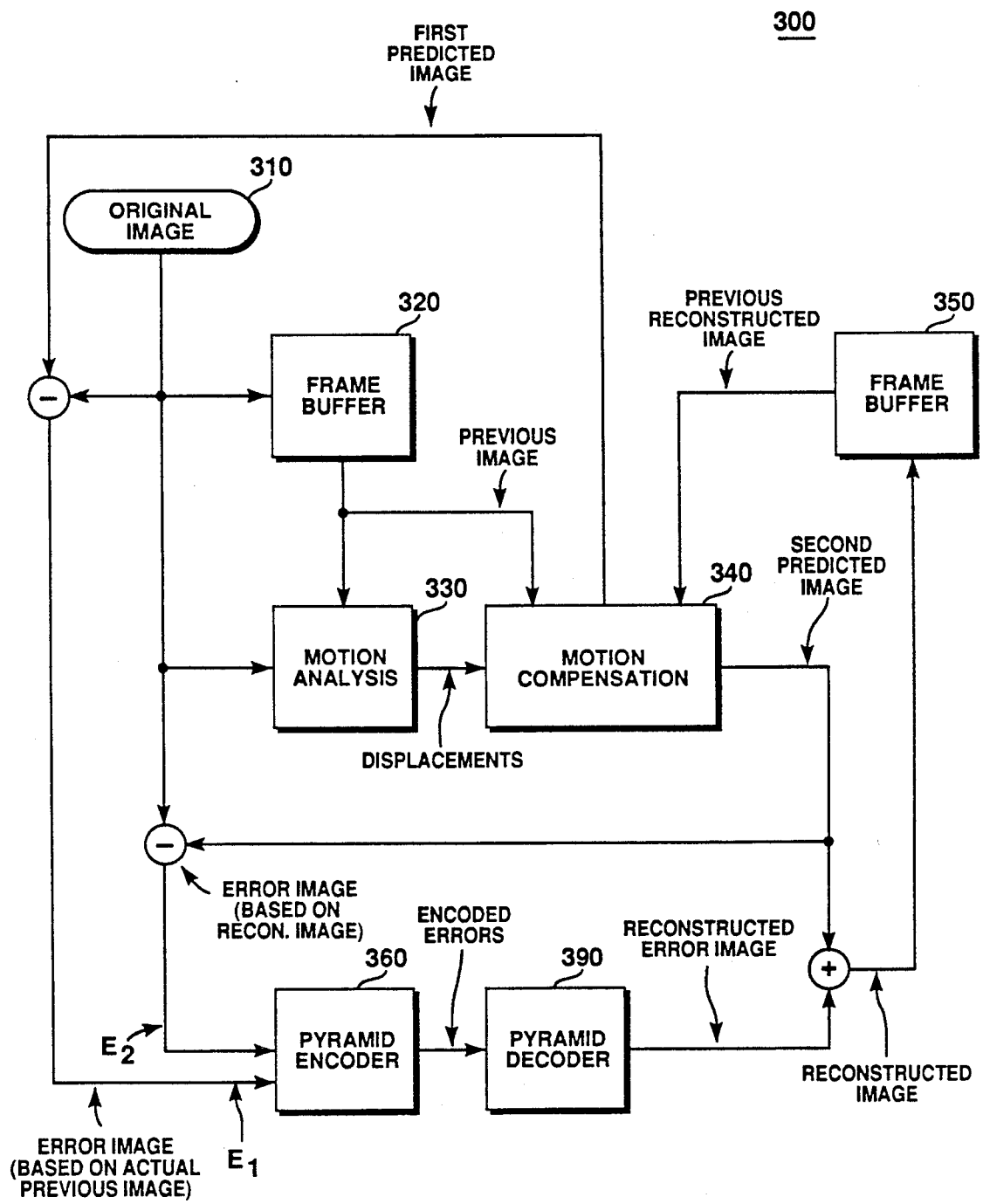
FIG. 3 is a flow diagram illustrating the operation of an improved system for generating error images from motion analysis according to a preferred embodiment of the present invention.

Referring now to FIG. 3, there is shown a flow diagram illustrating the operation of an improved system 300 for generating error images from motion analysis according to a further preferred embodiment of the present invention. Original image 310 is selected from a sequence of two or more digital video images. During sequence coding, a previous image is generated by storing original image 310 in frame buffer 320 while original image 310 is being encoded. Motion analyzer 330 is provided for determining displacement vectors by applying motion analysis to original image 310 and a previous image. Thereafter, motion compensator 340 generates two different predicted images. The first predicted image is generated by applying the displacement vectors to the actual previous image (from frame buffer 320); the second predicted image is generated by applying the displacement vectors to a previous reconstructed image (from frame buffer 350). A first error image $E_1$, based on the actual previous image, is formed by subtracting the first predicted image from original image 310. A second error image $E_2$, based on a reconstructed image, is formed by subtracting the second predicted image from original image 310. Pyramid encoder 360 is provided for generating encoded errors from the first and second error images. The output of pyramid encoder 360 is provided to pyramid decoder 390 to generate a reconstructed error image. A reconstructed image is then formed by summing the reconstructed error image and the second predicted image. Finally, the previous reconstructed image used by motion compensator 340 is formed by storing the reconstructed image in frame buffer 350 for one coding cycle.

Figure 4:
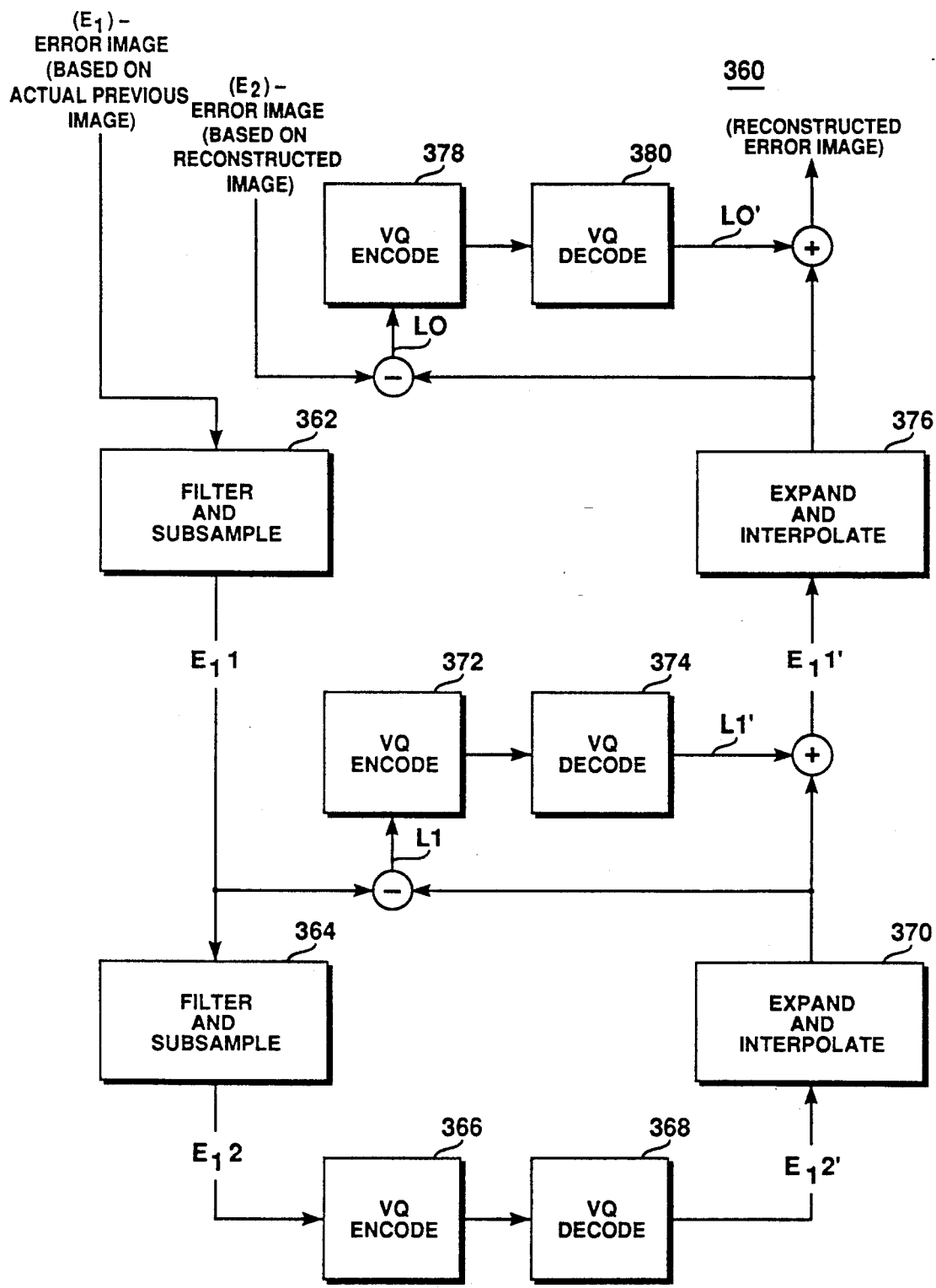
FIG. 4 is a flow diagram showing the operation of a pyramidal encoder for encoding the error images generated by the system of FIG. 3, according to a further preferred embodiment of the present invention.

In FIG. 4, there is shown a flow diagram illustrating the operation of a pyramid encoder 360 for encoding the first and second error images $E_1$, $E_2$ generated by system 300, according to the preferred embodiment of the present invention. In contrast to the pyramid encoder of FIG. 1, in pyramid encoder 360 all levels of the pyramid except the full resolution level are encoded using the first error image $E_1$. At full resolution, an expanded image from the lower resolution levels is subtracted from the second error image $E_2$, and their difference is encoded. Referring now to the preferred embodiment shown by FIG. 4, filter and subsampler 362 is provided for filtering first error image $E_1$ with a low-pass filter, and then subsampling the output of the low-pass filter to generate a first lower resolution image $E_1 1$. Filter and subsampler 364 is provided for filtering first lower resolution image $E_1 1$ with a low-pass filter, and then subsampling the output of the low-pass filter to generate a second lower resolution image $E_1 2$. In an alternate embodiment, filter and subsampler 362 and filter and subsampler 364 may each function substantially in accordance with filter and subsampler 120.

VQ encoder 366 is provided for encoding lower resolution image $E_1 2$ using vector quantization (VQ) encoding. The output of encoder 366 is provided to VQ decoder 368 to generate a decoded image $E_1 2'$ which is of the same resolution as second lower resolution image $E_1 2$. Image expander 370 forms a first expanded image by interpolating decoded image $E_1 2'$ up to the resolution of the first lower resolution image $E_1 1$. This first expanded image is then subtracted from first lower resolution image $E_1 1$ and the resultant difference image (L1) is encoded by VQ encoder 372. The output of VQ encoder 372 is provided to VQ decoder 374 which generates a decoded image L1' which is of the same resolution as the first expanded image. Decoded image L1' and the first expanded image are then summed to form image $E_1 1'$. Image expander 376 forms a second expanded image by interpolating image $E_1 1'$ up to the full resolution level of second error image $E_2$. This second expanded image is then subtracted from second error image $E_2$ and the resultant difference image (L0) is encoded by VQ encoder 378. The output of VQ encoder 378 is provided to VQ decoder 380 which generates a decoded image L0' which is of the same resolution as first and second error images $E_1$, $E_2$ (full resolution). A reconstructed error image may then formed by summing decoded image L0' and the second expanded image.

The present invention may be implemented using an Intel model i860 parallel processor or a general purpose processor.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for encoding an original image comprising the steps of:
   (a) dividing said original image into a plurality of regions;
   (b) selecting a region from said plurality of regions;
   (c) determining a region energy value in accordance with the magnitudes of the pixels in said selected region;
   (d) comparing said region energy value to a threshold;
   (e) forming a filtered image by selectively zeroing said selected region in accordance with said comparison;
   (f) resolving said filtered image into at least one lower resolution image;
   (g) encoding said at least one lower resolution image;
   (h) forming an expanded image from the result of step (g), said expanded image being of the same level of resolution as said original image;
   (i) encoding an image representative of the difference between said original image and said expanded image.

2. The method of claim 1, wherein said region energy value represents the mean-square-value of a plurality of pixels in said selected region.

3. The method of claim 1, wherein quantization is applied to said original image and the value of said threshold is determined in accordance with the expected energy of the quantization noise.

4. The method of claim 1, wherein the value of said threshold is determined in accordance with the noise level in said original image.

5. The method of claim 1, wherein steps (b) through (e) are repeated for each region of said original image.

6. The method of claim 1, wherein step (e) comprises the step of:
   (e) if said region energy value is less than said threshold, then zeroing said selected region to form said filtered image.

7. An apparatus for encoding an original image comprising:
   (a) means for dividing said original image into a plurality of regions;
   (b) a region selector for selecting a region from said plurality of regions;
   (c) a region energy determinator for determining a region energy value in accordance with the magnitudes of the pixels in said selected region;
   (d) a comparator for comparing said region energy value to a threshold;
   (e) a filter for forming a filtered image by selectively zeroing said selected region in accordance with the output of said comparator;
   (f) a subsampler for resolving said filtered image into at least one lower resolution image;
   (g) a first encoder for encoding said at least one lower resolution image;
   (h) an image expander for forming an expanded image in accordance with the output of said first encoder, said expanded image being of the same level of resolution as said original image; and
   (i) a second encoder for encoding an image representative of the difference between said original image and said expanded image.

8. The apparatus of claim 7, wherein said region energy value represents the mean-square-value of a plurality of pixels in said selected region.

9. The apparatus of claim 7, wherein quantization is applied to said original image and the value of said threshold is determined in accordance with the expected energy of the quantization noise.

10. The apparatus of claim 7, wherein the value of said threshold is determined in accordance with the noise level in said original image.

11. The apparatus of claim 7, wherein said filter zeros said selected region to form said filtered image if said region energy value is less than said threshold.

* * * * *